(No Model.) 2 Sheets—Sheet 1.
A. R. PULLIN.
SIGN OR SIGNAL.
No. 369,614. Patented Sept. 6, 1887.
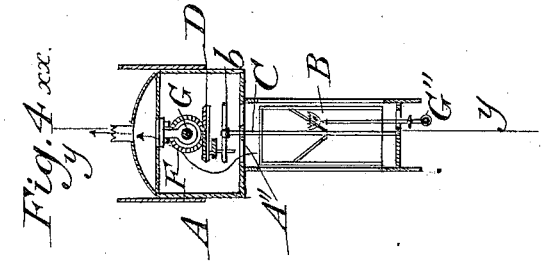
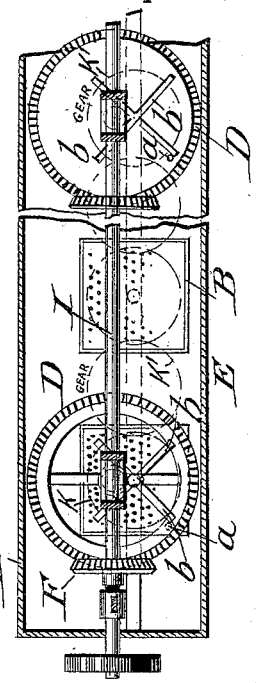
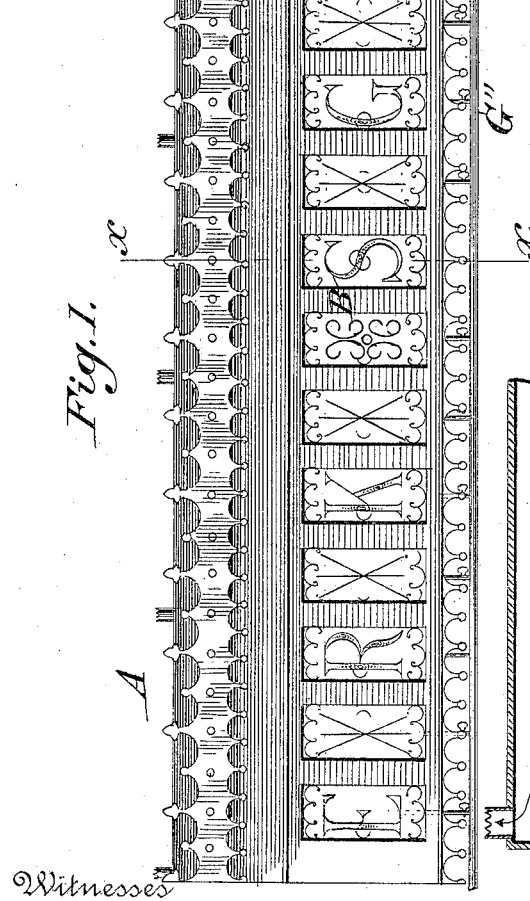
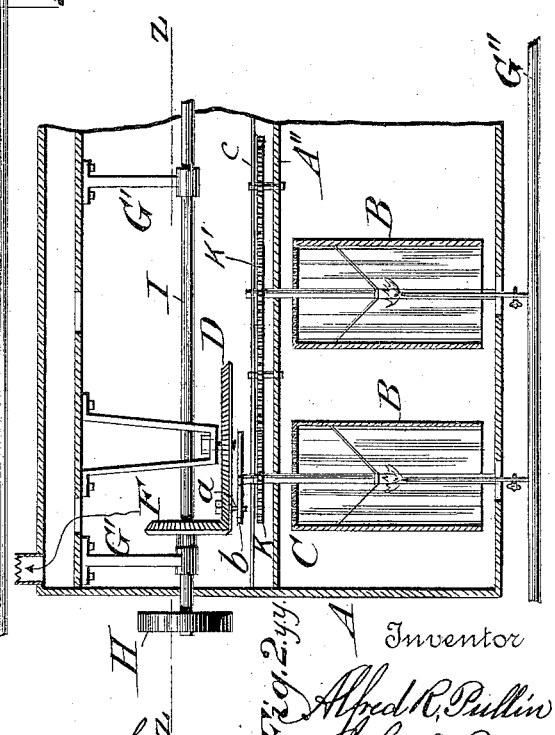
Witnesses
F. H. Schott
Wm. E. Rogers
Inventor
Alfred R. Pullin.
By his Attorney
John C. Tasker (No Model.)  2 Sheets—Sheet 2.

A. R. PULLIN.
SIGN OR SIGNAL.

No. 369,614. Patented Sept. 6, 1887.

Witnesses  Inventor

UNITED STATES PATENT OFFICE.

ALFRED R. PULLIN, OF SYDNEY, NEW SOUTH WALES, AUSTRALIA.

SIGN OR SIGNAL.

SPECIFICATION forming part of Letters Patent No. 369,614, dated September 6, 1887.

Application filed May 13, 1887. Serial No. 238,114. (No model.)

*To all whom it may concern:*

Be it known that I, ALFRED R. PULLIN, a subject of the Queen of Great Britain, residing at Sydney, in New South Wales, Australia, have invented certain new and useful Improvements in Signs or Signals; and I do hereby declare the following to be a full, clear, and exact description of the invention, such as will enable others skilled in the art to which it appertains to make and use the same.

This invention relates to an improvement in signs or signals; and it consists, essentially, in a series of lamps unlighted by day, but lighted by night, arranged in connection with suitable mechanical means for simultaneously revolving said lamps, and thereby changing the names, pictures, or other devices of advertisement or signalizing that are painted or inscribed upon the faces or sides of the lamps; and the invention further consists in certain peculiarities in the construction, arrangement, and combination of the several parts, substantially as will be hereinafter described in detail, and then pointed out in the appended claims.

Figure 5:
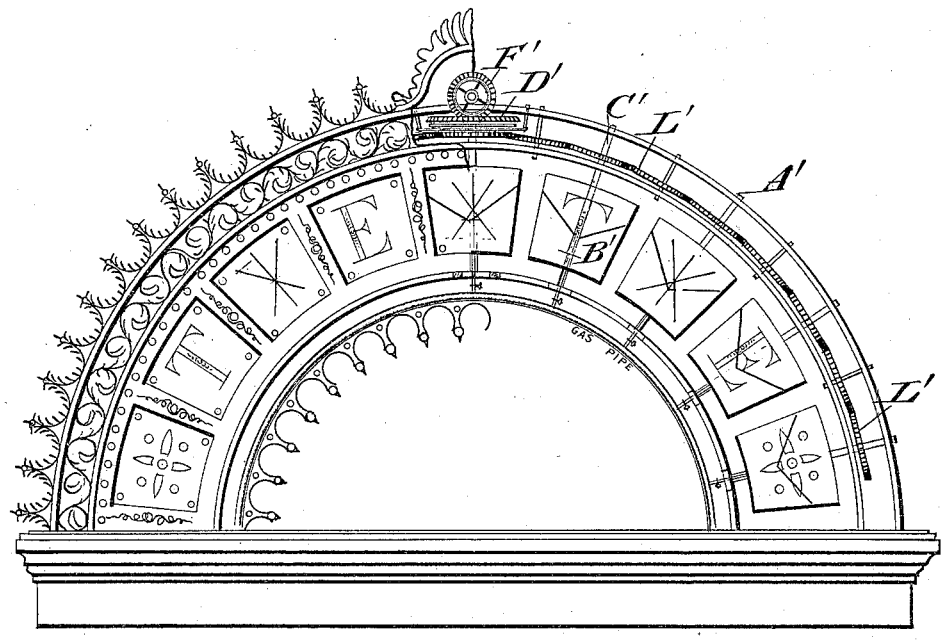
Figure 6:
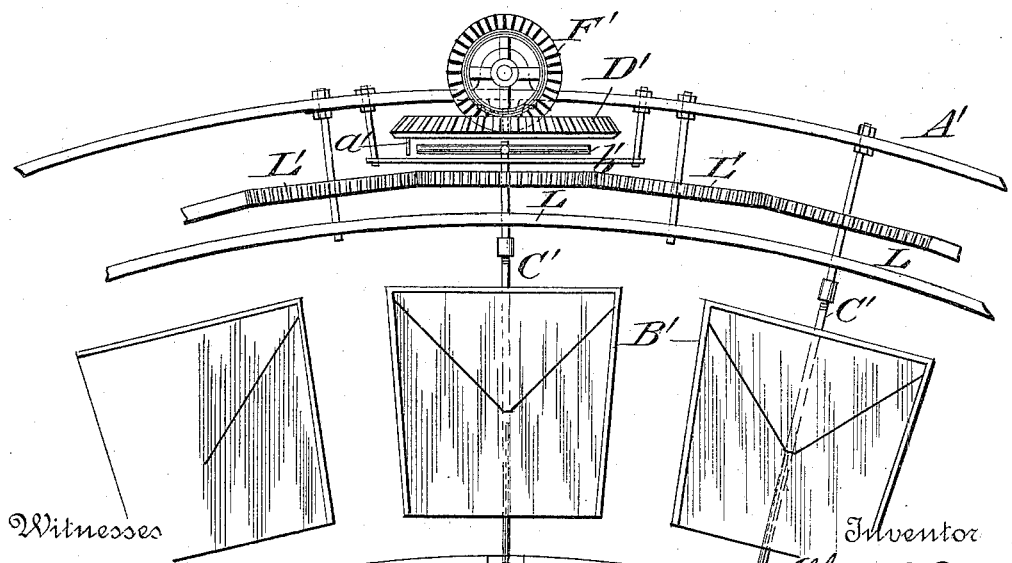

In the accompanying drawings, illustrating my invention, Figure 1 is a longitudinal side elevation of the frame-work containing the parts of my improved signal. Fig. 2 is a partial longitudinal section on the line $y\,y$ of Fig. 4. Fig. 3 is a partial horizontal section on the line $z\,z$ of Fig. 2. Fig. 4 is a cross vertical section on the line $x\,x$ of Fig. 1. Fig. 5 is a modified form of the frame-work that contains the lamps, a portion of the side being removed to show the mechanism for revolving said lamps. Fig. 6 is an enlarged elevational detail of a few of the lamps and the mechanism for operating them, as shown in Fig. 5.

Similar letters of reference denote corresponding parts throughout all the figures.

A represents the frame-work within which the lamps are arranged. This may be of any convenient and desirable form, and is generally shaped to suit the architecture of the building or structure to which it is to be affixed. Thus, for example, Fig. 1 shows the frame-work having a long rectangular form, while Fig. 5 shows it made in semicircular shape, as A'. Each of the vertical sides of this frame-work is provided with a series of apertures of suitable dimensions to permit the advertisements, signs, or signals marked upon the lamps within the frame to be easily displayed through them. The apertures or openings on opposite sides of the frame are located so as to be adjacent to each other, and a lamp is situated between the members of each pair of adjacent apertures. These lamps (denoted by B) are suitably journaled in the frame, as shown in Fig. 2, so as to be capable of revolving, there being preferably provided a horizontal partition, A'', in said frame, and the journals for the lamps entering said partition and the bottom of the frame. When gas-lamps are used, the gas may be conveyed thereto by the pipe G'', placed horizontally beneath the frame A. It is shown, however, that other modes of illumination may be employed with equal success.

To the top, centrally of each of the end lamps of the series, is rigidly fastened a turnstile consisting of the vertical rod C, passing up through the partition A'' and serving for the upper journal for the lamp, and the horizontal cross-arms $b\,b$, secured to the rod C at its upper extremity.

Within the frame-work, at each end and above the part A'', are horizontal bevel gear-wheels D D, pivotally supported by studs on projections or supports fastened to the upper part of the frame-work A. These gears are each provided near the periphery with a downwardly-projecting pin, $a$, so arranged relatively to the cross-bars $b\,b$ of the turnstiles that during the rotations of the gears D D, consequent upon their actuation by suitable means, said pins $a$ may come in contact with the cross-bars and act thereon to revolve the lanterns B. The rotary motion thus imparted to the said end lanterns is communicated to the other lanterns in the series by a gearing-connection consisting of gears K, secured to the turnstile-rods C, and likewise to the vertical upper journal-rods of all the lamps, and intermediate gears, K', between gears K, all of said gears meshing together. The rods or short shafts that carry all these gears have bearings in the partition or bar A'' and a second partition or bar, $c$. It is obvious that this mode of gearing may be varied or equivalent modes substituted therefor without departing from the spirit of my invention.

Alongside of the horizontal gears D D, and intermeshing therewith, are vertical bevel-pinions F F, mounted upon a horizontal shaft, I, which is journaled in suitable hangers, as G', attached to the frame-work. Power may be applied to revolve the shaft I in any suitable manner, as, for instance, a connection with the pulley H on said shaft. It will be evident that the revolution of shaft I will, through the medium of the mechanism just described, revolve the lamps simultaneously and present their several faces in succession through the apertures in the frame-work adjacent to said lamps; for when the pins $a$ come in contact with a turnstile-arm it causes each of the lamps to rotate a segment of a circle, and, as said pins describe in their paths of movement complete circles, said pins will be brought in contact in turn with each arm of the turnstiles and the lamps caused to expose their several faces successively through the apertures. After every segment of rotation of the lamps there is a pause to allow each face to be read before a second change is effected.

In Figs. 5 and 6 is shown a modification in the arrangement of the lamps whereby they are located in a semicircular instead of a straight series, and in consequence of this changed arrangement of the lamps and to suit the same it becomes necessary to correspondingly readjust and adapt the motive mechanism which revolves the lamps. A' in the present case denotes the frame. A single central bevel-gear, D', takes the place of the pair of gears D D in Figs. 2 and 3, and this is actuated by the bevel-pinion F'. The gear D' has a downwardly-projecting pin, $a'$, which acts upon the cross-arms of a turnstile affixed to the central lantern, B', in the same manner that the pins $a$ act on the arms $b$ of the turnstiles of the end lanterns in Figs. 2 and 3. The central lantern, B', is the only one of the series which in this modified form of my invention is provided with a turnstile, and the lanterns are connected together and rotated simultaneously by means of gear-wheels L, secured to rods C', attached to the lanterns, and intermediate gears, L', all of said gears intermeshing, as shown, between gears L, the actuating impulse for the series coming from the gear which is attached to the turnstile of the middle lantern. This mode of connecting the lamps for the simultaneous rotation of all in the series is made necessary from the fact that the lanterns are journaled in a radial series.

Having thus described my invention, what I claim as new, and desire to secure by Letters Patent, is—

1. The combination of the inclosing-frame having lateral apertures, a series of lamps having signs or signals delineated on the faces thereof and journaled in the frame opposite said apertures, and mechanical devices consisting of turnstiles and appropriate gearing for intermittently revolving the series of lamps, substantially as described.

2. The combination of the inclosing-frame having lateral apertures, a series of signaling-lanterns arranged revolubly in the frame opposite said apertures, each end lantern being furnished with a turnstile, the horizontal pin-provided wheels, and the connections for simultaneously rotating the lamps, substantially as described.

3. The combination of a series of signaling-lanterns suitably connected and journaled revolubly in a proper frame, with means for rotating said lanterns simultaneously, consisting of a turnstile carried by one of the lanterns, and a horizontal wheel having a pin that acts on the turnstile-arms when the wheel is rotated, substantially as described.

4. The combination, with a series of signaling-lanterns arranged in a suitable frame, of means for rotating them, consisting of horizontal pin-carrying gears and vertical gears carried by a horizontal shaft meshing therewith, turnstiles carried by the end lanterns, having cross-arms adapted to be acted upon by the pins, and connecting gears carried by each of the lanterns so that they may be rotated simultaneously, substantially as described.

In testimony whereof I affix my signature in presence of two witnesses.

ALFRED R. PULLIN.

Witnesses:
PHILIP MAURO,
FRED E. TASKER.